US012689525B2

(12) United States Patent　　　　(10) Patent No.: US 12,689,525 B2
Asor　　　　　　　　　　　　　　　　　　(45) Date of Patent: Jul. 21, 2026

(54) METHODS AND SYSTEMS FOR DIGITAL IDENTIFICATION AND CERTIFICATION

(71) Applicant: IDNI AG, Triesen (LI)

(72) Inventor: Ohad Asor, Triesen (LI)

(73) Assignee: IDNI AG, Triesen (LI)

( * ) Notice: Subject to any disclaimer, the term of this patent is extended or adjusted under 35 U.S.C. 154(b) by 240 days.

(21) Appl. No.: 18/222,724

(22) Filed: Jul. 17, 2023

(65) Prior Publication Data

US 2024/0022433 A1　　Jan. 18, 2024

Related U.S. Application Data

(60) Provisional application No. 63/390,060, filed on Jul. 18, 2022, provisional application No. 63/390,043, filed on Jul. 18, 2022.

(51) Int. Cl.
H04L 9/32　　　　(2006.01)
H04L 9/06　　　　(2006.01)

(52) U.S. Cl.
CPC .......... H04L 9/3263 (2013.01); H04L 9/0643 (2013.01); H04L 9/321 (2013.01)

(58) Field of Classification Search
CPC ...... H04L 9/3263; H04L 9/0643; H04L 9/321
See application file for complete search history.

(56) References Cited

U.S. PATENT DOCUMENTS

| | | | |
|---|---|---|---|
| 6,192,131 B1 * | 2/2001 | Geer, Jr. ................. | G06F 21/33 |
| | | | 713/168 |
| 10,237,259 B2 * | 3/2019 | Ronda ................... | H04L 9/3247 |
| 2006/0200857 A1 * | 9/2006 | Yokota ................ | H04L 63/0823 |
| | | | 726/6 |
| 2010/0122081 A1 * | 5/2010 | Sato ...................... | H04L 9/3263 |
| | | | 713/158 |
| 2010/0185864 A1 * | 7/2010 | Gerdes, Jr. ............ | H04L 9/3213 |
| | | | 713/176 |
| 2015/0095999 A1 * | 4/2015 | Toth ...................... | H04L 9/3263 |
| | | | 726/6 |
| 2019/0279204 A1 * | 9/2019 | Norton ................... | G06Q 10/08 |
| 2020/0162254 A1 * | 5/2020 | Moreno ................ | H04L 9/3247 |
| 2020/0336907 A1 * | 10/2020 | Jain ....................... | H04L 9/3236 |
| 2021/0051027 A1 * | 2/2021 | Wang .................... | H04L 9/3239 |
| 2022/0116230 A1 * | 4/2022 | Dietrich ................. | H04L 9/006 |
| 2022/0391850 A1 * | 12/2022 | Morris ..................... | H04L 9/50 |

* cited by examiner

*Primary Examiner* — Shanto Abedin
(74) *Attorney, Agent, or Firm* — Cesari and McKenna, LLP

(57) ABSTRACT

A computer-implemented method for issuing reusable certificates of user uniqueness or for a user's arbitrary claim comprises receiving a request from a first user for a certification together with supporting evidence; verifying validity, relevance and completeness of the supporting evidence regarding the request; and issuing a reusable certificate in conjunction with a public cryptographic key of the first user.

17 Claims, 2 Drawing Sheets

315

215

300

215     315

100     Central Authority     215     Context Owner     205

210

101

300

302     User Claim     User Evidence     301

Certifying Entity     200

201     Sufficient?     No     Ask for Additional Evidence     202

Yes

User Certificate for Arbitrary Claim     500

METHODS AND SYSTEMS FOR DIGITAL IDENTIFICATION AND CERTIFICATION

CROSS-REFERENCE TO RELATED APPLICATIONS

This application claims the benefit of, and priority to, U.S. Provisional Application Ser. No. 63/390,043, and U.S. Provisional Application Ser. No. 63/390,060, both filed Jul. 18, 2022, the contents of each of which are hereby incorporated by reference herein in their entireties.

FIELD OF THE INVENTION

The invention generally relates to computer-implemented methods and computer systems that allow digital identification and certification for internet users. More specifically, the invention pertains to methods and systems for providing global proof of the uniqueness of internet users and for providing arbitrary attestation to anonymous internet users.

BACKGROUND

Many modern information systems including blockchains, content delivery systems and social networks make use of public cryptographic keys as a way to identify users on the system.

From the users' perspective, a public key is a "self-sovereign" way of declaring and managing their identity since users can create their own public keys, and present them on any system they wish. However, one problem with public keys is that a single person can create many public keys. Therefore, a user cannot prove claims about uniqueness of identity, or verify such claims by other users.

For example, a viewer of customer review pages might want to make sure that each user that reviewed a product is a unique real person, and reviews a product only once to avoid the multiple review problem. Another example is an information system designed to tally user votes on one or more elections. Such a system would require each system user to be a unique physical person to keep a single person from voting multiple times in the same election.

In some cases, users want to prove their uniqueness without revealing any identifying information. A public key, while not containing any personally identifying information, is itself an identifier that could be used to track a user across information systems much like a web browser "cookie" is used to track web surfers across websites. This type of tracking, even if it is anonymous at first, can eventually lead to the users being de-anonymized if they ever login to an information system that knows their true identity. Therefore, there is a need for users to prove their uniqueness without even revealing their public key. We call this concept "zero-knowledge uniqueness". Aspects of the present invention, in its many embodiments, seek to remedy the shortcomings of the conventional methods of user authentication by creating a service that can certify that a public key, or a hash thereof, is owned by a single physical user and that a user cannot associate more than one unique public key to a claim of uniqueness. Such a service can be used by any information system to verify the uniqueness of their users or by any internet users to prove their uniqueness anonymously, or to verify such claims by other users.

Some information systems, and their users, may benefit if the system contains additional verified information about the users on a "good enough security" basis. For example, a user wishing to play the role of an online tutor, might benefit from presenting certain credentials such as academic diplomas or professional certificates and for such credentials to be verified by an independent authority. The same benefits and requirements would apply to a user wishing to provide medical advice on an online forum.

Individual users would also like to have their academic and professional credentials recognized by users of any online information system and without going through the credential verification process with each information system. In one embodiment of the present invention, the user is able to paste a simple text message in an online forum saying "here is some medical advice, and you can trust me because I am a doctor", followed by a signature attesting to the fact that the user holds a medical degree from an accredited institution, without even revealing personal details, e.g. name. Aspects of the present invention, in its many embodiments, seek to remedy the shortcomings of the conventional methods of user authentication and certification by creating a service that can certify and provide reusable arbitrary attestations to any user identified by a public key. Such a service can be used by any information system, or by anyone on the Internet, to verify the validity of any claim by anyone.

Many attempts were made in the past to create a shared user identification, authentication and certification system— for example the encryption program "Pretty Good Privacy" (PGP)—but all such attempts have been met with limited success for various reasons. One of those reasons is the absence of trusted third parties coupled with a central authority. Some information systems have sought to lock-in users to their platform by making user certifications available only within their platform, and users have no way to present verifiable credentials independently of any information system. Hence the need for the present invention.

It is therefore an object of the present invention to provide improved systems and methods for digital identification and certification for internet users.

A first aspect of the invention pertains to systems for issuing reusable certificates of user uniqueness. According to some embodiments, the system comprises a central authority database server and one or more certifying entities, the central authority database server comprising a user database storing a record for each of a plurality of users, each record comprising a unique internal identifier for the respective user across all certifying entities. The certifying entities are configured to verify, upon receiving a request from a first user for a uniqueness certificate, one or more identification documents of the first user, and to communicate to the central authority a cryptographic hash of identifying attributes of the first user. The central authority database server is configured to store the cryptographic hash in the user database as a unique internal identifier for the first user and to determine whether the cryptographic hash is unique. If the cryptographic hash is found to be unique, the system (i.e. the certifying entity, the central authority or both) is configured to issue a reusable certificate of global uniqueness for the first user, the certificate being associated with a user public key.

According to some embodiments, the identification documents are official documents, such as officially issued passports, birth certificates, or driving licenses.

According to some embodiments, the central authority database server and the one or more certifying entities are operated independently from each other. This means that they (and their operators) do not share non-anonymized information about the user with each other. In some embodiments, they may also be owned by the different operators.

According to some embodiments, the cryptographic hash is (or comprises) a cryptographic public key or a hash of a public key (a possibly salted hash) associated with the first user's identity.

According to some embodiments, the first user's request is rejected if the cryptographic hash is not found to be unique.

According to some embodiments, the central authority database server is configured to update, upon a request from the first user or one of the certifying entities for a revocation of the first user's identity, the first user's record to indicate that the first user's identity was revoked.

According to some embodiments, the central authority database server is configured to receive a request from a party (i.e. a "third" party) requiring uniqueness information regarding the first user, to create a uniqueness context ID and to send it to the first user, to receive a message from the first user, the message being signed using a globally unique public key, comprising the uniqueness context ID and a context specific public key of the first user, and to create a context dependent uniqueness certificate and to send it to the party, wherein the context dependent uniqueness certificate is configured to be used for verifying uniqueness within the context identified by the context ID without revealing the user's globally unique public key to the verifier.

According to some embodiments, a user-friendly string name is associated with the uniqueness context ID.

According to some embodiments, a system for issuing reusable certificates of user uniqueness, comprises a central authority database server comprising a user database storing a record for each of a plurality of users, each record comprising a unique internal identifier for the respective user. The central authority database server is configured to verify, upon a request from a first user for a uniqueness certificate, one or more identification documents of the first user, to store in the user database a cryptographic public key for the first user and a cryptographic hash of the first user's identifying attributes as a unique internal identifier for the first user, and to determine whether the cryptographic hash is unique. If the cryptographic hash is found to be unique, the central authority database server is configured to issue a reusable certificate of global uniqueness for the first user, the certificate being associated with the user public key.

According to some embodiments, the central authority is configured to update, upon receiving a request from the first user for a revocation of the first user's identity, the first user's record to indicate that the first user's identity was revoked.

A second aspect of the invention pertains to a system for issuing reusable certificates for a claim of a first user, the system comprising one or more certifying entities, each certifying entity being configured to receive a request from the first user for certification of a claim together with evidence supporting the claim, to verify validity, relevance and completeness of the supporting evidence regarding the first user's claim, and to issue a reusable certificate in conjunction with a public cryptographic key of the first user.

According to some embodiments, the system comprises a central authority database server configured to create standards and policies to be followed by all certifying entities of the system, to regulate the activity of the certifying entities and/or supply them with information systems, maintenance and support services.

According to some embodiments, the evidence comprises at least one of academic diplomas issued by an academic institution to the first user or professional certificates issued by a professional certifying institution to the first user. The certifying entity receiving the academic diplomas or professional certificates is configured to associate the one or more academic diplomas or professional certificates with the public cryptographic key of the first user and to include the one or more academic diplomas or professional certificates as an attribute to the issued certificate.

According to some embodiments, the system comprises a central authority database server comprising a user database storing a record for each of a plurality of users, wherein the central authority database server is configured to update, upon receiving a request from the first user or one of the certifying entities for a revocation of the issued certificate, the first user's record to indicate that the issued certificate has been revoked, wherein any requests to the central database authority regarding the validity of the issued certificate would indicate that it has been revoked.

A third aspect of the invention pertains to a computer-implemented method for issuing reusable certificates of user uniqueness or for a user's arbitrary claim. The method comprises receiving a request from a first user for a certification together with supporting evidence, verifying validity, relevance and completeness of the supporting evidence regarding the request, and issuing a reusable certificate in conjunction with a public cryptographic key of the first user.

According to some embodiments, the requested certification is a uniqueness certificate for the first user and the supporting evidence comprises one or more identification documents of the first user. In this case, the method further comprises creating a cryptographic hash from identifying attributes of the first user, storing a cryptographic hash in a user database as a unique internal identifier for the first user, and determining whether the cryptographic hash is unique. If the cryptographic hash is found to be unique, a reusable certificate of global uniqueness is issued for the first user, the certificate being associated with the public cryptographic key of the first user.

According to some embodiments, a certifying entity receives the request, verifies the one or more identification documents, creates the cryptographic hash and communicates the cryptographic hash to a central authority database server, and the central authority database server stores the cryptographic hash and determines whether the cryptographic hash is unique.

According to some embodiments, a central authority database server receives the request, verifies the one or more identification documents, creates the cryptographic hash, stores the cryptographic hash and determines whether the cryptographic hash is unique.

According to some embodiments, the requested certification is a certificate for a claim of the first user, wherein validity, relevance and completeness of the supporting evidence are verified regarding the claim of the first user. For instance, the claim is related to a qualification of the first user. In this case, the supporting evidence may comprise one or more academic diplomas or professional certificates issued to the first user.

BRIEF DESCRIPTION OF THE DRAWINGS

The detailed description below refers to the accompanying drawings, of which.

DETAILED DESCRIPTION

Figure 1:
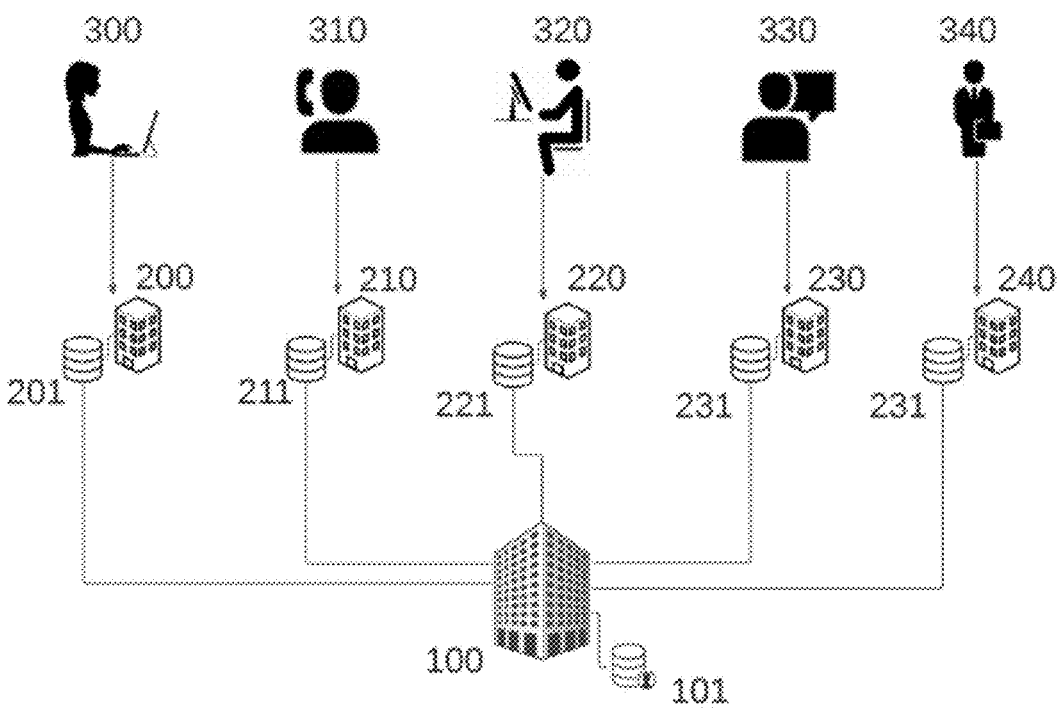
FIG. 1 shows a block diagram of the different components of an exemplary embodiment of a system according to the present invention.

FIG. 1 shows a block diagram of the different components of some embodiments of a system according to the present invention. The users 300, 310, 320, 330 and 340 communicate with the certifying entities 200, 210, 220, 230 and 240, each equipped respectively with their own database servers 201, 211, 221, 231 and 241 as one possible means of communication, which in turn communicate with a central authority 100 equipped with its central database server 101. Note that a user can solicit the services of more than one certifying entity, but all certification requests (and certification revocation requests) have to go through the central authority in order to be verified for uniqueness.

Such a system allows globally issuing uniqueness certificates for users 300, 310, 320, 330 and 340 on the Internet. It may be composed of a central authority 100 and a plurality of certifying entities 200. Among the functions of this system is to certify that a physical person 300 has associated one and only one public cryptographic key to a uniqueness claim. A holder of a public key wishing to use the system to obtain a certificate of uniqueness, needs to contact a certifying entity 200, which verifies the user's identity documents and collects his/her identifying data fields, possibly computes a hash of those data fields, then queries the central authority 100 to verify that previous claim of uniqueness was not already made by this person. If uniqueness is confirmed, then the certifying entity 100 issues a reusable certificate of uniqueness to the end user holding the public key, in the form of plaint text accompanied with a cryptographic signature of the verifying entity and/or of the central authority. Additional submissions of the same identity (or hash thereof) to the central authority 100 will be identified by central authority with the first submission and the uniqueness claim will be rejected. The system may be designed to be used by other information systems, as well as individual users (with or without a specific support from the information systems), that want to have verified uniqueness of identity usable by simple copy-paste of plain text. Such systems may include social networks, voting systems, customer review listings and benefits distribution systems.

In a preferred embodiment of the present invention, a central database authority 100 works in collaboration with a plurality of certifying entities 200 to verify the uniqueness of the identity of a user 300. The function of the certifying entities 200 is to inspect the user's government or administration issued identification documents. While the function of the central database authority 100 is to attest the global uniqueness of any cryptographic public in the system and to revoke any certification. Specifically, the central authority 100 is necessary in order to prevent the case in which the user uses two or more certifying entities 200 in order to associate uniqueness claims with multiple public keys. This cannot be prevented in the absence of a central authority 100, while on the other hand, inspection of identity documents cannot be done automatically without a significant compromise on the hardness of faking an identification, nevertheless such a compromise might be acceptable by some users in some cases, and hence in another embodiment of the invention, image and character recognition methods are used in order to extract information from identity documents, possibly with face-recognition-based user authentication and/or other biometric methods, and by that further automate the process.

In one instance of this system, the certifying entity 200 might require the user 300 to be present in person at a physical location and present his/her government or administrative identity documents. In another possible implementation of the present invention, the certifying entity 200 might only require that the user 300 establishes a video conference call with them and transmit the certifying documents via electronic means before or during the video conference. In yet another embodiment, the certifying entity 200 would optionally verify, by any means possible, the authenticity of the user's government or administration issued documents. This optional step may include an electronic exchange of information with a government, or administrative, entity to ensure the documents presented, have not expired and were not subjected to any tampering. In yet another usage scenario, the certifying entity might require different or additional documents or any kind of evidence, such as a school identification card, a driver's license or even a utility bill. Once the certifying entity 200 is satisfied with the authenticity and validity of the user's evidence, and considers them as a satisfying proof of identity, then it proceeds with the next steps in the identity process. In another embodiment, every certifying entity 200 has to follow a minimal set of standards and procedures to ensure the accuracy and authenticity of the user's documents, while in another embodiment, each certifying entity will set its own rules for user document requirements, or any other form of evidence. In one embodiment of the present invention, the certifying entity 200 would save into its own database a copy of all users' documents, while in another embodiment, the certifying entity does not keep any permanent records of the user's documents.

The identifying information may include, among other fields, the user's first name or given name, last name or family name, date of birth, place of birth, nationality, national identification number or passport number as well as the date and place of issuance, and expiration dates, of all such documents. Optionally, one or more of the user information fields must be used in order to fully identify the user and guarantee the uniqueness of an association, while in another embodiment all fields are optional.

Once the user's information is collected and verified, the user 300 is asked to create a private/public key pair, if he/she has not already created one, or provide an existing public key. In one embodiment, the certifying entity 200, or the central database authority 100, would provide to the user 300 a software package, running on the user's computer, that can assist in the secure creation of a key pair. In yet another embodiment, the user can use an existing tool such as GPG or a crypto-currency wallet to generate the key pair.

Since, preferably, many certifying authorities 200, 210, 220, 230, 240 are supported, there is a need for a central database server 101 to establish the global uniqueness of an identity. In a preferred embodiment, once the certifying entity 200 is satisfied with the validity of the user's documents, it proceeds with the next step which is the verification of the global uniqueness of the identity by communicating with the central database authority 100. In a preferred embodiment, the certifying entity 200 wishes to establish the uniqueness of the association while maintaining the privacy of the user 300. To do so, it may only communicate to the central identity authority 100 a cryptographic hash of all the identity fields combined together. The central database server 101 will keep the cryptographic hash secret to protect against brute force attacks on the cryptographic hash. Optionally, the certifying entity 200 may communicate, in conjunction with the identity cryptographic hash, the public key associated with the identity, possibly hashed.

The central database comprises at least one table containing the identity cryptographic hash (i.e. the hash of the text of the identifying fields such as name) or the identifying details unhashed, as communicated by the certifying entity 200. When an identity is entered into the central database server 101 for the first time, its cryptographic hash or plaintext identity details are stored together with other attributes such as the requesting certifying entity, the timestamp of creation and optionally the public key of the new identity (possibly hashed as well). The public key can later be used, by either the user 300 or one of the certifying authorities 200, to revoke or disable the identity. For the revocation function, the central database server 101 is configured to respond to queries, from anyone, asking whether a public key, either the user's or the certifier's, or any certificate have expired or has been revoked.

Figure 2:
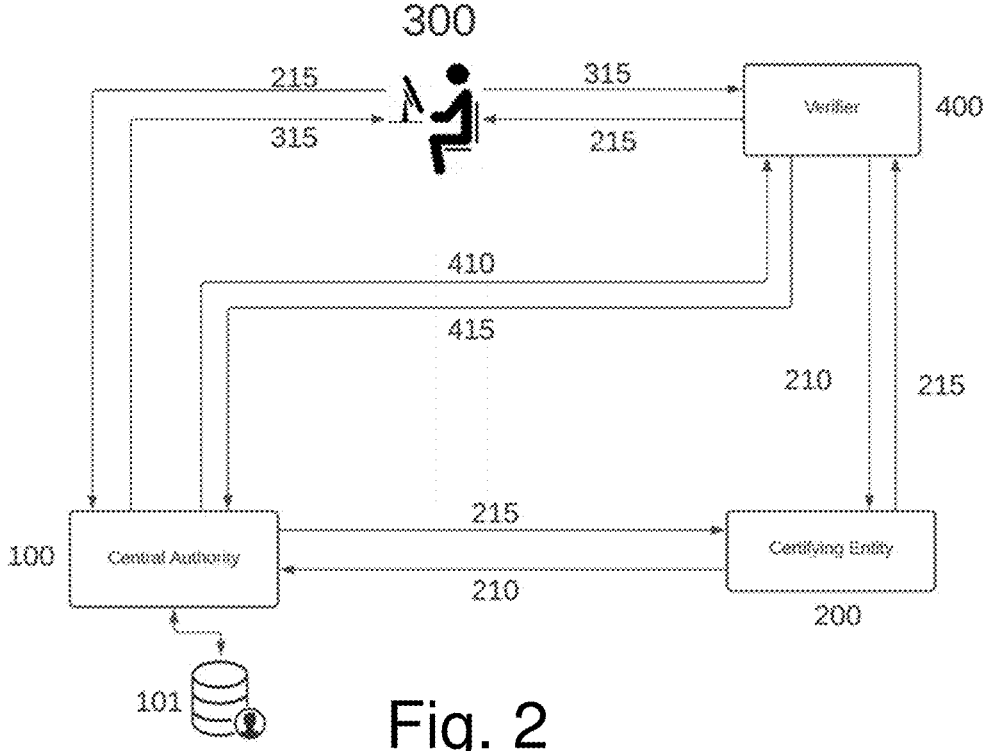
FIG. 2 shows a block diagram illustrating an exemplary workflow of the usage of a uniqueness certificate.

FIG. 2 shows a block diagram illustrating the workflow of the usage of a uniqueness certificate. Once a user 300 is issued a certificate of uniqueness for a public key, the user can submit it to any information system to prove uniqueness claims. To verify the validity of a uniqueness claim, the verifier 400 has to read and verify the validity of the cryptographic signatures in the user's certificate. This can be done by running the standard cryptographic algorithms associated with the certificate (For example ECDSA) using as inputs the public key of the central authority 100 and/or that of the certifying entity 200. Note here that a verifier 400 does not have to accept certificates of uniqueness from any certifying entity but can choose to trust only a subset of the certifying entities. Once the certificates are validated, the verifier 400 can choose to check if the certificates have not been revoked since their issuance. In order to do that the verifier 400 would have to communicate with the certifying authority 200 or the central authority 100, to check that the user's uniqueness certificate has not been revoked. Additionally, the verifier 400 might want to make sure that the certifying authority 200 is still in good standing with the central authority 100. To do that, a verifier can check that the certifying authority's key with the central authority 100 is still valid, by communicating directly (automatically or manually) with the central authority 100.

Optionally, either user 300, or certifying entity 200 can send a certificate revocation requests 210, 310, to the central authority 100 to revoke a user certificate. Any party can send a message to the central authority, requesting the validity of a user certificate. The central authority 100 will consult its certificate revocation list 101, and respond back with the certificate revocation status.

Figures 3, 4:
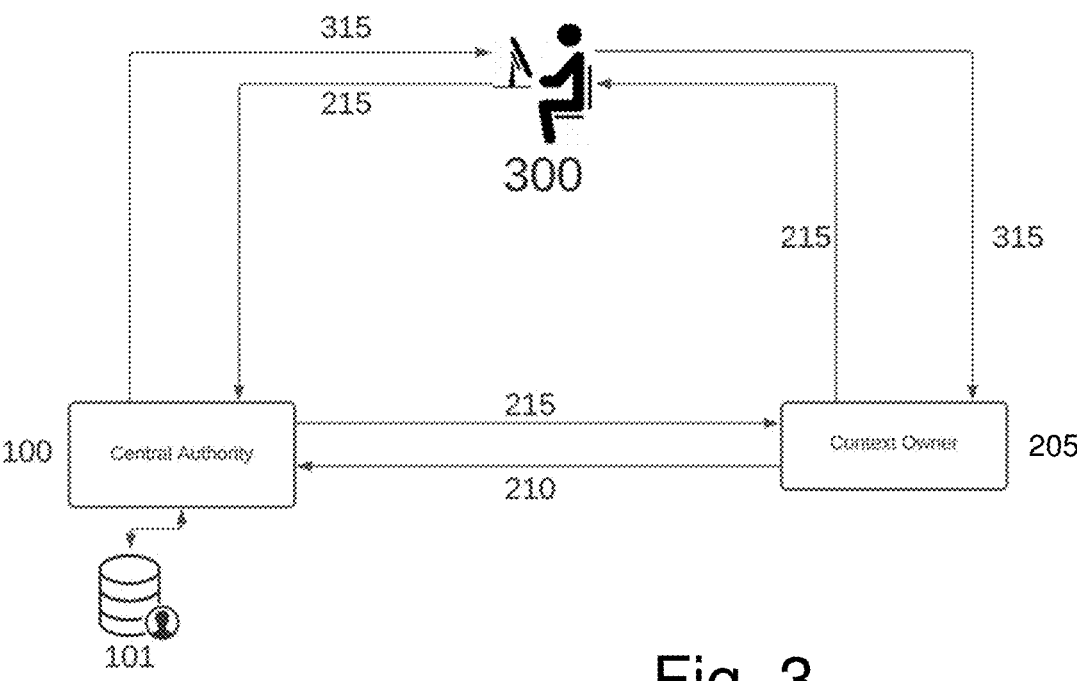
FIG. 3 shows a block diagram illustrating the creation and usage of a context specific certificate of uniqueness according to exemplary embodiments.
FIG. 4 shows the information and decision flow in an exemplary embodiment of a system according to the present invention.

FIG. 3 shows a block diagram illustrating the creation and usage of context specific certificates of uniqueness. The context owner 205, desiring to create a context where each user is unique, sends request 210 to the central authority 100 to create a uniqueness context ID 215. User 300 is challenged by the context owner with uniqueness context ID 215 and forwards it to the central authority 100, together with the user's globally unique public key and another, context specific public key. The central authority returns a context specific certificate of uniqueness 315 to the user 300, who forwards it to the context owner 205, thereby proving the user's uniqueness within the context 215. This way, users 300 are able to prove their uniqueness without submitting their globally unique public key to the context owner 205.

Instead, the user 300 creates a new public key as a token of uniqueness within a specific context.

If, for example, if the context owner 205 is running two or more elections in which a user 300 can vote in any election only once, then the context owner 205 may create a separate "uniqueness context" for each election. To prove their uniqueness in any one context, each user 300 retrieves the uniqueness context identifier from the context owner 205, generates a new context specific public key (or reuse an old one), then sends both to the central authority 100, in a message possibly signed by the user's globally unique public key and receive from the central authority a certificate of uniqueness that is specific to the uniqueness context. The user 300 can then vote in one specific election using the uniqueness certificate for context specific public key. The user 300 may need to repeat this process for every election or other context in which proof of uniqueness is required and the user does not want to leave a traceable action.

This method allows the context owner 205 to be assured of user uniqueness within any context without being able to track users 300 across contexts without their permission. However, if the user 300 does not care about potential traceability, then the user can re-use an older uniqueness public key and certificate in more than one context. To allow the user 300 to easily recognize and refer to each uniqueness context, the central authority 100 may require the context owner 205 to associate a user-friendly string name with the uniqueness context when creating a uniqueness context ID. This user-friendly name could be a registered Internet domain name.

FIG. 4 shows a block diagram illustrating the workflow associated with the creation of attestation to an arbitrary claim.

Some aspects of the present invention relate to a method and system for associating arbitrary attestations to any public cryptographic key. FIG. 4 shows the information and decision flow in an exemplary system according to such an aspect of the present invention. The system is designed to be used by other information systems, as well as individual users, that want to prove, or verify, any arbitrary claim by a user. Such systems may include social networks, voting systems, and customer review listings. User 300 supplies user evidence 301, in support of user claim 302, which are sent together, or separately, to certifying entity 200. At step 201, the certifying entity 200 makes a decision on whether the provided user evidence 301 is sufficient to support the user claim 302. If yes, then the certifying entity 200 issues a user certificate of arbitrary claim 500. If no, then the certifying entity 200 will send a request 202 to the user for more user evidence 301.

A user representation and attestation system may be composed of one or more certifying entities 200 and optionally a central authority (not shown here). Among the functions of the certifying entity 200 of this system is to verify the validity of an arbitrary user claim 302. Once verified, the user's claim is optionally submitted to the central authority, possibly hashed, together with a public cryptographic key. The certifying entity 200 then issues a reusable certificate to the user attesting to the verified claim. Such arbitrary verification may include proof of age, employment status, professional certifications, diplomas, or any provable arbitrary claim by the user.

In a preferred embodiment, a certifying entity 200 issues a reusable certificate 500 for any claim by a user providing the user can demonstrate to the certifying entity 200 sufficient proof 301 supporting the claim 302. This service is called "Arbitrary Attestations". The user 300 is then free to submit the claim 302 and the certificate 500 to any online information provider or simply send it by email to another user, or embed it in a document.

In yet another preferred embodiment, the certifying entities 200 can accept from the user 300 one or more credentials such as academic diplomas, professional certifications or professional licenses. The concept of "Arbitrary Attestations" extends the concept of attestation and certification to the most general scope possible. For example, a store owner wants to prove that she's been in business for at least ten years. She would present to the certifying entity 200 a set of documents, or internet references, in support of her claim. The certifying authority 200, if satisfied with the adequacy of the supporting proof, would then issue to the user a reusable certificate 500 to that effect. If not satisfied, the certifying entity may ask for additional proof 202 of the user's claims. Finally, the certifying entity 200 is able to link the arbitrary attestation certification 500 to any public key provided by the user.

In a preferred embodiment, the user is identified solely by the chosen public key and no personally identifiable user information is present in the certificate 500. To associate the public key with a certificate 500, the public key is made part of the certificate's possibly hashed text message. A user can obtain multiple certificates 500 of arbitrary claims either under the same public key or under different public keys. In the latter case, no third party entity is able to make a link between any two certificates 500 of arbitrary claim if they are associated with two different public keys. If two certificates of arbitrary claim are associated with the same public key, then it can be understood by anyone that both certificates were issued to the same person.

A skilled person is aware of the fact that details, which are here shown and explained with respect to different embodiments, can also be combined with details from other embodiments and in other permutations in the sense of the invention.

What is claimed:

1. A system for issuing reusable certificates of unique association between a public key and a physical person, wherein no more than one public key is associated with the same person, the system comprising a central authority database server and one or more certifying entities, the central authority database server comprising a user database storing a record for each of a plurality of users, each user being a physical person, each record comprising an internal identifier for the respective physical person and a public key associated with the respective physical person, wherein:

the certifying entities are configured to receive, from a first user, a public key together with a request for a certificate of unique association with the public key, the first user being a physical person;

the certifying entities are configured to verify one or more identification documents of the first user, and to communicate to the central authority a plaintext or a cryptographic hash of identifying attributes of the first user together with the public key; and the central authority database server is configured to determine whether the plaintext or cryptographic hash is already associated with another public key, wherein, if the plaintext or cryptographic hash is found to be not already associated with another public key:

the central authority database server is configured to store the plaintext or cryptographic hash and the public key in the user database; and the certifying entity and/or the central authority are configured to issue a reusable certificate of unique association between the public key and the first user.

2. The system of claim 1, wherein the identification documents are official documents.

3. The system of claim 1, wherein the central authority database server and the one or more certifying entities are operated independently from each other.

4. The system of claim 1, wherein the cryptographic hash is a cryptographic public key or a hash of a public key associated with the first user's identity.

5. The system of claim 1, wherein, if the plaintext or cryptographic hash is found to be already associated with another public key, the first user's request is rejected.

6. The system of claim 1, wherein, upon a request from the first user or one of the certifying entities for a revocation of the first user's identity, the central authority database server is configured to update the first user's record to indicate that the first user's identity was revoked.

7. The system of claim 1, wherein, upon a request from the first user for a revocation of the first user's key, the central authority is configured to update the first user's record to indicate that the first user's key was revoked.

8. A system for issuing reusable certificates of key uniqueness, the system comprising a central authority database server and one or more certifying entities, the central authority database server comprising a user database storing a record for each of a plurality of users, each record comprising an internal identifier for the respective user across all certifying entities, wherein:

the certifying entities are configured to verify, upon a request from a first user for a uniqueness certificate, one or more identification documents of the first user, and to communicate to the central authority a plaintext or a cryptographic hash of identifying attributes of the first user; and the central authority database server is configured to store the plaintext or cryptographic hash in the user database as a unique internal identifier for the first user and to determine whether the plaintext or cryptographic hash is unique, wherein, if the plaintext or cryptographic hash is found to be unique, the certifying entity and/or the central authority are configured to issue a reusable certificate of global uniqueness for the first user, the certificate being associated with a user public key, wherein, upon receiving a request for the creation of a uniqueness context ID from a context owner, the central authority database server is configured:

to create the uniqueness context ID and to return it to the context owner;

to receive a message from the first user, the message being signed using a globally unique public key of the first user, comprising the uniqueness context ID; and to create a context dependent uniqueness certificate and to send it to the first user, wherein the context dependent uniqueness certificate is configured to be used for verifying uniqueness within the context identified by the context ID without revealing the user's globally unique public key.

9. The system of claim 8, wherein a user-friendly string name is associated with the uniqueness context ID.

10. A system for associating an attestation of experience to a public cryptographic key, the system comprising one or more certifying entities, each certifying entity being configured to receive a request from a first user for certification of a claim together with evidence supporting the claim and a public cryptographic key of the first user, the first user's claim being related to a first user's experience, wherein the certifying entities are configured to verify an association between the first user and the public cryptographic key of the first user, wherein the certifying entities are configured to verify the association between the first user and the public cryptographic key of the first user based on a reusable certificate of unique association between the public key and the first user, to verify validity, relevance and completeness of the supporting evidence regarding the first user's claim, and to issue a cryptographically signed certificate in the form of text comprising the claim and the public cryptographic key of the first user, wherein the certificate comprises no information that allows identifying the first user.

11. The system of claim 10, comprising a central authority creating standards and policies to be followed by all certifying entities of the system, to regulate the activity of the certifying entities and/or supply them with information systems, maintenance and support services.

12. The system of claim 10, wherein the evidence comprises at least one of academic diplomas issued by an academic institution to the first user or professional certificates issued by a professional certifying institution to the first user.

13. The system of claim 10, comprising a central authority database server comprising a user database storing a record for each of a plurality of users, wherein, upon a request from the first user or one of the certifying entities for a revocation of the issued certificate, the central authority database server is configured to update the first user's record to indicate that the issued certificate has been revoked, wherein any requests to the central database authority regarding the validity of the issued certificate would indicate that it has been revoked.

14. The system of claim 10, wherein the first user's experience comprises at least one of an age of the first user and an employment status of the first user.

15. The system of claim 10, wherein the first user's experience comprises at least one of a professional certification held by the first user and a diploma issued to the first user.

16. The system of claim 10, wherein the first user's experience comprises work experience of the first user.

17. The system of claim 10, comprising a central authority database server comprising a user database storing a record for each of a plurality of users, the record comprising the certificate of unique association between the public key and the first user.

* * * * *